United States Patent [19]

Greene

[11] 4,090,811

[45] May 23, 1978

[54] FLUID CURRENT MOTOR

[76] Inventor: Michael L. Greene, 13103 Venango Rd., Oxon Hill, Md. 20022

[21] Appl. No.: 724,718

[22] Filed: Sep. 23, 1976

[51] Int. Cl.² .............................................. F03D 3/06
[52] U.S. Cl. .................................. 416/119; 416/197 A
[58] Field of Search .................. 416/111, 119, 197 A, 416/DIG. 4

[56] References Cited

U.S. PATENT DOCUMENTS

| 17,168 | 4/1857 | Nutting | 416/119 |
| 897,132 | 8/1908 | Pacey | 416/117 X |
| 955,305 | 4/1910 | Bailey | 416/17 |
| 1,535,585 | 4/1925 | Dyer | 416/119 |
| 1,915,689 | 6/1933 | Moore | 416/117 |
| 2,441,635 | 5/1948 | Iverson | 416/117 X |

FOREIGN PATENT DOCUMENTS

| 18,290 | 1/1930 | Australia | 416/111 |
| 498,294 | 1/1951 | Belgium | 416/117 |
| 944,152 | 3/1949 | France | 416/111 |
| 475,423 | 10/1952 | Italy | 416/111 |
| 396,368 | 1/1933 | United Kingdom | 416/111 |

Primary Examiner—Everette A. Powell, Jr.

[57] ABSTRACT

An apparatus employing an assembly of four flat vanes is disclosed for obtaining kinetic energy from a working fluid. The four flat vanes are disposed in two moveable pairs, that vary in frontal area in a working fluid, to produce torque about a central axis of rotation. One or more of the apparatuses are mounted on a vertical shaft unto which may be secured a pulley for distributing power in a conventional way.

2 Claims, 1 Drawing Figure

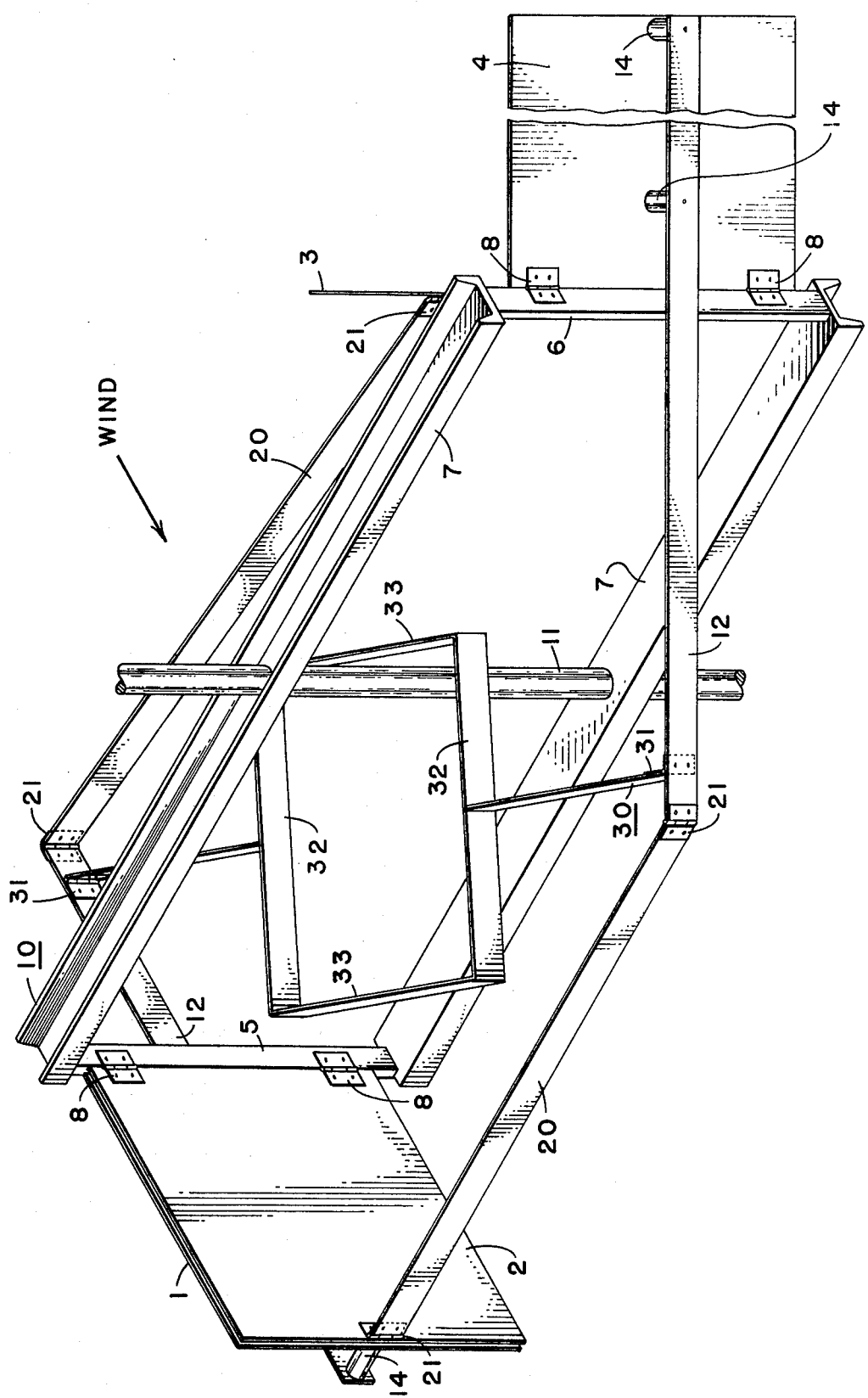

FLUID CURRENT MOTOR

BACKGROUND OF THE INVENTION

This invention relates to an apparatus employing an assembly of four flat vanes for obtaining kinetic energy from a working fluid, and more particularly, to a simple, few moveable parts apparatus employing an assembly of four flat vanes presenting a varied frontal area for engaging a working fluid.

Heretofore devices for extracting kinetic energy from such working fluids as the wind have made use of impeller-driven generators, which are mounted on derricks. These devices, often referred to as windmills, have a rudder means or directional vane for directing the impeller into the eye of the wind. The derrick must support the weight of the impeller-driven generator, the forces associated with the wind, and the gyroscopic forces normally associated with impeller-driven generators. The impeller may require close-tolerance vanes. In addition, some impellers may have means for adjusting the angle of attack or cyclic pitch change of the vanes to extract kinetic energy from a low velocity wind and reduce the rotational speed of the impeller in a high velocity wind to prevent destructive gyroscopic forces.

Another distinct type of device for extracting kinetic energy from a working fluid consists of vanes which rotate about a vertical axis. These vertical mounted devices, such as the Tice rotor, Savonius rotor, S-rotor, and Darrieus rotor, do not always employ close-tolerance vanes, are omnidirectional to the wind in a horizontal plane, do not necessarily require dericks, are not subject to some of the destructive gyroscopic actions normally associated with impeller-driven generators, and operate at lower rotational speeds. In addition, these vertical mounted devices may have means to adjust the angle of attack and cyclic pitch change of the vanes. This is usually done with gears or mechanical-electro means in conjunction with a directional vane to determine the eye of the wind. These devices, which include anemometers, rotate when the working fluid drag on one side of the vertical axis of rotation exceeds the working fluid drag on the other side.

SUMMARY OF THE INVENTION

Form or pressure drag, which is large when compared to the drag due to skin-friction on this invention, is defined by the following equation:

$$D = C_D q S$$

The terms in the above equation are as follows:
 $D$ = drag
 $C_D$ = coefficient of drag
 $q$ = dynamic pressure
 $S$ = area The object of this invention is to improve the efficiency of an apparatus employing an assembly of four flat vanes by minimizing the drag on one side of the axis of rotation of the assembly by making S, the area upon which the drag is calculated, approach zero. In addition, $C_D$, the coefficient of drag, also becomes smaller as S approaches zero, because of the nature of the means by which S is made to approach zero.

The device of this invention may be placed in a working fluid to extract kinetic energy from said working fluid. The device includes a rectangular frame centrally mounted and attached in a vertical position to a rotatable shaft. Disposed on each vertical end member of the frame are a pair of flat vanes, which are vertically hinged to said vertical member to form a "V". The apex of each pair of flat vanes face the plane of the frame. Therefore, a working fluid moving perpendicular to said frame will close and minimize the frontal drag area of the pair of flat vanes with its apex facing into the direction from which the working fluid is moving and open and tend to maximize the frontal drag area of the other pair of flat vanes with its apex facing away from the direction from which the working fluid is moving. The flat vanes are mechanically connected to assure that the two pairs of flat vanes will open and close in unison.

BRIEF DESCRIPTION OF THE DRAWING

The FIGURE illustrates a perspective view of the device illustrating the relative parts.

DETAILED DESCRIPTION

Now referring to the drawing, there is illustrated an apparatus employing an assembly of four flat vanes made in accordance with the teachings of this invention. As shown, the device includes a rotatable frame 10 affixed with conventional means onto rotatable vertical shaft 11, that is supported in the vertical position for rotation with suitable support means, not shown, containing thrust and roller bearings. Frame 10 is comprised of vertical brackets 5 and 6, and horizontal cross-members 7. Cross-members 7 are secured at their centers to vertical shaft 11, and vertical brackets 5 and 6 are secured to the ends of cross-members 7, are so arranged that they rotate with vertical shaft 11 located in the central portion of the cross-members 7.

Pairs of flat vanes 1 and 2, and 3 and 4 are hinged with hinges 8 to vertical brackets 5 and 6 respectively. This permits each pair of flat vanes, 1 and 2, or 3 and 4, to move relative to each other to form a "V" when in the open position. The "V's" are orientated in such a manner that the apex of each "V" faces the plane of the frame, and the vanes of each "V" when closed will be perpendicularly disposed to cross-members 7. Therefore, fluid flowing normal to the edge of vertical brackets 5 or 6, which is at the apex of flat vanes 1 and 2, and 3 and 4 respectively, will tend to open one set of "V's" while closing the other set of "V's". The drawing shows flat vanes 1 and 2 in the closed position, the vanes are parallel to each other, and flat vanes 3 and 4 in the open position due to a working fluid, labled wind, that is shown by an indicating arrow. The wind as shown will cause frame 10 to rotate in a clockwise direction. Obviously, between opening and closing of each pair of flat vanes, the transition period, both pairs of flat vanes will be in a "V" position. To insure that these "V's" will open and close appropriately, the closing pair of vanes will effect the opening of the other pair of flat vanes and the opening pair of vanes will effect the closing of the other pair of flat vanes, in actual use to minimize and maximize the drag area perpendicular to the direction from which the working fluid is moving, the following mechanical connections are made between the flat vanes:

Relay rods 20 are connected at their ends with hinges 21 between the edges opposite the apex of the hinged side of flat vanes 2 and 3 and extension rods 12, which are rigidly attached to flat vanes 1 and 4. Extension rods 12 are fastened to flat vanes 1 and 4 with suitable means, and held in position to avoid interfering with vertical brackets 5 and 6 by cylindrical stand-offs 14. As shown, when flat vane 3 or 4 is in the open position, flat vane 1 or 2 will be in the closed position, because of the geometry of extension rod 12 and the length of relay rod 20. If flat vane 3 or 4 is moved into the closed position, then flat vane 1 or 2 will move into the open position due to the action of hinged relay rod 20 and extension rod 12.

Flat vanes 1 and 3, and 2 and 4, which are connected by extension rod 12 and relay rod 20, are interconnected, flat vanes 1 and 2 to flat vanes 3 and 4, by push-pull shuttle rod 30. The ends of push-pull shuttle rod 30 are attached to extension rods 12 by hinges 31. The center of push-pull shuttle rod 30 forms an aperture, comprised of brackets 32 and 33, to permit non-interference oscillation through vertical shaft 11. The action of push-pull shuttle rod 30 assures that the "V's" will open and close in unison, one "V" will open when the other "V" is closing, or one "V" will close when the other "V" is opening. For example, when flat vane 1 moves from a closed position into an open position, flat vane 3 will move from an open position into a closed position due to the action of extension rod 12 and hinged relay rod 20. In addition, the hinged end of push-pull shuttle rod 30 attached to said extension rod 12 will be moved toward the right. The other end of push-pull shuttle rod 30 will move extension rod 12, attached to flat vane 4, counterclockwise and close said vane while hinged relay rod 20 opens flat vane 2. The opposite would now happen if the push-pull shuttle rod 30 was moved to the left by extension rod 12 attached to opening flat vane 4.

Any suitable adjustment means to extension rod 12, relay rod 20, and push-pull shuttle rod 30, obvious to one skilled in the art, may be used to have the opening pair of flat vanes stop opening at an included angle of 180° or less when the closing flat vanes have closed.

The open pair of flat vanes will present a frontal area normal to the direction from which the working fluid is moving equal to the sum of the area on one side of the pair of flat vanes times the sine of one-half the included angle between the two flat vanes forming said "V". The closed set of flat vanes will present a frontal area equal to the edges of the flat vanes normal to the direction from which the working fluid is moving.

Multiple apparatuses employing assemblies of the four flat vanes as herein described may be mounted on a single vertical axis and off-set by a given number of degrees equivalent to 360 divided by the number of apparatuses. In addition, the number of "V's" may be increased on a single level about a given vertical axis by increasing the diameter of the cross-members and the length of the associated relay rods and push-pull shuttle rods.

Mechanical means may be employed on one end of the rotating shaft to extract useable work.

The apparatus described herein may be used in conjunction with generating means to produce electric power from the wind, streams, rivers, ocean tides, and/or ocean currents. Further, said apparatus or apparatuses may be used to power moored buoys or moored surveillance stations; used to generate power when these devices are suspended from a barge, which is moored in a river or near-shore area where continuous or orbital currents are present; and generate power when mounted in remote areas where wind devices may be economically advantageous.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A working fluid apparatus comprising:
   at least one frame secured to a rotatable shaft,
   said frame including horizontal cross-members secured at their centers to said shaft and vertical brackets secured at their ends to the ends of said horizontal cross-members;
   at least two pair of flat cooperating vanes including an innermost and outermost vane with adjacent edges hinged to each vertical bracket of said frame and relative to each other so that their apex faces the flane of said frame;
   a horizontal rod affixed to said outermost vane of each pair of vanes and extending horizontally forward of said outermost vane;
   a second rod hinged to said innermost vane of each pair of vanes ahd hinged to said extending horizontal rod affixed to a diametrically opposite outermost vane; and
   a rod means,
   said rod means including a third rod with an aperture therein,
   said third rod hinged at each end to a horizontally extending rod.

2. The apparatus as set forth in claim 1 in which:
   each said frame is mounted in a horizontal position.

* * * * *